United States Patent [19]

Gougoulas

[11] 4,424,823

[45] Jan. 10, 1984

[54] TIRE SPRAY CLEANING SYSTEM

[76] Inventor: Harry Gougoulas, 24167 Ecorse, Taylor, Mich. 48180

[21] Appl. No.: 393,017

[22] Filed: Jun. 28, 1982

[51] Int. Cl.³ .............................................. B08B 3/02
[52] U.S. Cl. ..................................... 134/45; 134/100
[58] Field of Search .......................... 134/45, 100–101, 134/123

[56] References Cited

U.S. PATENT DOCUMENTS

| | | | |
|---|---|---|---|
| 3,368,571 | 2/1968 | Honorof | 134/100 |
| 3,419,022 | 12/1968 | Youngren, Sr. et al. | 134/45 |
| 3,537,423 | 11/1970 | Burden | 134/45 X |
| 3,587,807 | 6/1971 | Hickman | 134/45 X |
| 3,593,726 | 7/1971 | Lockhart et al. | 134/45 |
| 3,604,433 | 9/1971 | Notthoff | 134/45 |
| 3,667,486 | 6/1972 | Cole et al. | 134/45 |
| 3,670,743 | 6/1972 | Moore | 134/45 |
| 3,679,134 | 7/1972 | Nixon | 134/45 X |
| 3,915,179 | 10/1975 | Casson | 134/45 |
| 4,178,948 | 12/1979 | Swinehart | 134/45 |

Primary Examiner—Robert L. Bleutge
Attorney, Agent, or Firm—Reising, Ethington, Barnard, Perry & Milton

[57] ABSTRACT

Apparatus for automatically spray cleaning tires on vehicles moving along automatic car wash lines. A cleaning fluid discharge container is submerged in a cleaning fluid reservoir and filled with cleaning fluid. The cleaning fluid within the cleaning fluid discharge container is then forced out of the cleaning fluid discharge container with air pressure, and is discharged through spray cleaning nozzles. The spray cleaning nozzles on one side of the car wash line are mounted on telescopically extendable members to permit automatic adjustment of the spray cleaning nozzles to accomodate vehicles of varying sizes. A floating valve assembly is utilized to prevent the spray cleaning fluid supply lines from being purged of spray cleaning fluid during the spray cleaning cycle.

7 Claims, 4 Drawing Figures

TIRE SPRAY CLEANING SYSTEM

TECHNICAL FIELD

This invention relates to systems for spray cleaning vehicle tires.

BACKGROUND OF THE INVENTION

Automatic car wash lines are now widely employed as fast and convenient means of washing automobiles. A particular problem with automatic car wash equipment is providing some means for satisfactorily cleaning vehicle tires effectively with a minimal amount of cleaning fluid. This problem is aggravated by the great variance in the widths of vehicles that may be expected to travel down automatic car wash lines. The prior art in tire spray cleaning systems is exemplified by U.S. Pat. Nos. 3,419,022; 3,537,423; 3,587,807; 3,593,726; 3,604,433; 3,667,486; 3,670,743; 3,679,134; 3,915,179; and 4,178,948.

The present invention provides a tire spray cleaning system which does not require cleaning fluid pumps or electric controls, and thus reduces system cost and maintenance. One of the features of the present invention is that it conserves spray cleaning fluid by utilizing a fluid discharge container to limit the maximum amount of cleaning fluid discharged during a cleaning cycle to the amount of cleaning fluid required to fill the cleaning fluid discharge container prior to commencement of the cleaning cycle. Tire spray cleaning efficiency is further increased through utilization of a floating valve assembly, located within the fluid discharge container, as a means of preventing the cleaning fluid supply lines from being blown empty of cleaning fluid during a cleaning cycle, thus keeping the lines prepared for immediate spraying of the next tire to be cleaned. Automatic adjustment of the distance of the tire spray cleaning nozzles from tires on vehicles of varying widths is achieved by mounting the nozzles on automatically extendable pneumatic cylinders.

DISCLOSURE OF THE INVENTION

An object of the present invention is to provide a system for spray cleaning tires on vehicles moving along automatic car wash lines which does not require a cleaning fluid pump or electric controls, in the interest of reducing costs of purchasing and maintaining the system. Operational costs are further reduced by designing a system to conserve cleaning fluid by limiting the maximum amount of cleaning fluid that can be discharged during a given wash cycle, regardless of whether intermittent starting and stopping of the car wash line leaves a vehicle at a tire spray cleaning station for a longer period of time than is desired. Another object of the present invention is to provide an apparatus to automatically position the system's spray cleaning nozzles at a constant distance from the vehicle tires, regardless of the width of the vehicle, to ensure uniform tire spray cleaning of vehicles of different sizes.

In carrying out the above objects, a cleaning fluid discharge container is placed in the bottom of a cleaning fluid reservoir. This allows cleaning fluid within the reservoir to fill the cleaning fluid discharge container. When a vehicle then activates a switching device on the car wash line, the cleaning fluid within the cleaning fluid discharge container is forced out of the discharge container and through cleaning fluid supply lines to tire spray cleaning nozzles by pressurized air, where it is sprayed on the vehicle's tires.

Activation of the switching device by the vehicle also results in the automatic extension of a pneumatic cylinder, on which a spray cleaning nozzle is mounted. Extension of the pneumatic cylinder positions the spray cleaning nozzle at a fixed, predetermined distance from the vehicle's tire, regardless of the width of the vehicle.

The maximum amount of cleaning fluid that can be discharged during a cleaning cycle is limited to the amount of cleaning fluid which was required to fill the cleaning fluid discharge container prior to commencement of the cleaning cycle. Should the cleaning fluid discharge container be emptied of cleaning fluid during a wash cycle, a floating valve assembly located within the cleaning fluid discharge container closes and prevents the cleaning fluid supply line from being blown empty of cleaning fluid.

As the vehicle moves along the car wash line, the switching device is deactivated, thus completing the cleaning cycle. Deactivation of the switching device permits the fluid discharge container to refill with cleaning fluid, and also permits the pneumatic cylinder, on which the spray cleaning nozzle is mounted, to return to its normally retracted position. At this point, the tire spray cleaning apparatus is prepared for another cleaning cycle.

A pneumatic agitation nozzle is provided to maintain a uniform mixture of the contents of the cleaning fluid reservoir during each wash cycle.

BEST MODE FOR CARRYING OUT THE INVENTION

Figure 1:
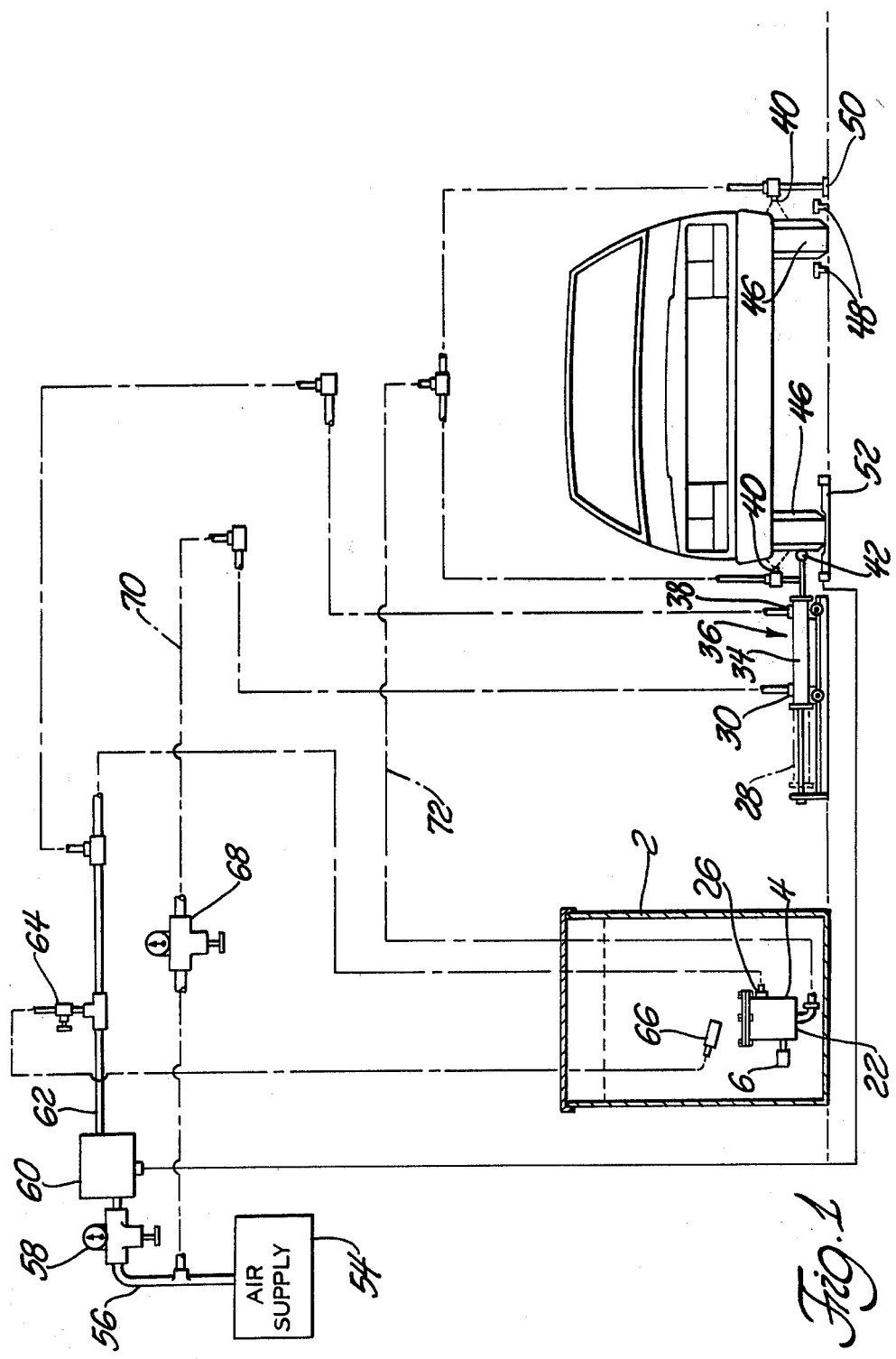
FIG. 1 is a diagrammatic view of a system embodying the invention.
Figure 2:
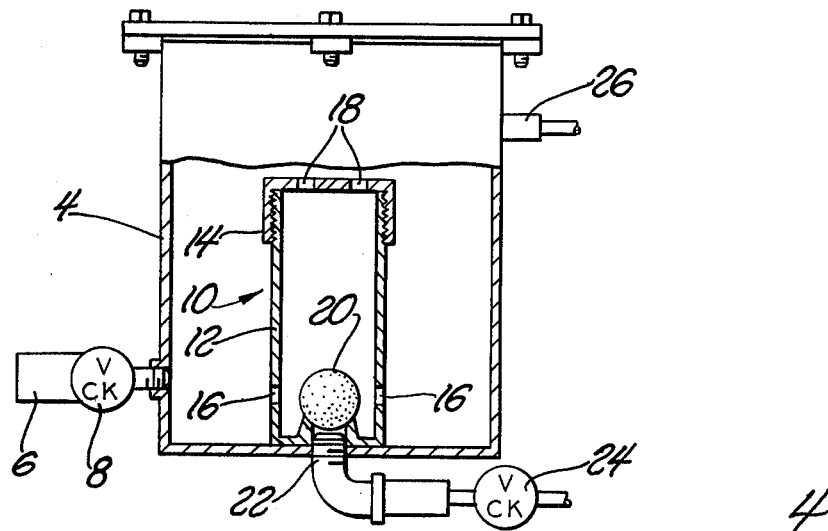
FIG. 2 is an elevational view, partially in section of the fluid discharge container and the floating valve device.

Referring to FIGS. 1 and 2, cleaning fluid discharge container 4 is submerged in cleaning fluid by placing it in the bottom of cleaning fluid reservoir 2. The cleaning fluid discharge container 4 may be a three (3) fluid ounce airtight container, and the reservoir 2 may be any suitable fluid holding device, typically in practice a 55 gallon drum. Submerging cleaning fluid discharge container 4 in cleaning fluid permits cleaning fluid to flow into and fill cleaning fluid discharge container 4 via cleaning fluid inlet port 6. As the cleaning fluid fills cleaning fluid discharge container 4, air trapped within cleaning fluid discharge container 4 is permitted to flow out via air pressure port 26, which is permitted to freely communicate with the atmosphere by air supply control valve 60.

As fluid fills cleaning fluid discharge container 4, it simultaneously flows into floating valve assembly 10 via fluid inlet ports 16. Floating valve assembly 10 consists of floating body guide 12, floating body guide cap 14 and floating body 20. Floating body guide 12 may be a small piece of steel pipe onto which floating body guide cap 14 is either threaded or welded. Floating body 20 may be a small rubber ball which has a lower density than the cleaning fluid used.

As floating valve assembly 10 fills with fluid, air within floating valve assembly 10 is released through breather ports 18. Floating body 20 floats on the surface of the cleaning fluid as it flows into floating valve assembly 10, and thus floats away from fluid outlet port 22, leaving fluid outlet port 22 open. Cleaning fluid is prevented from siphoning out of cleaning fluid reservoir 2, and leaking out of cleaning fluid supply line 72, by spring loaded ball check valves 24.

Figure 3:
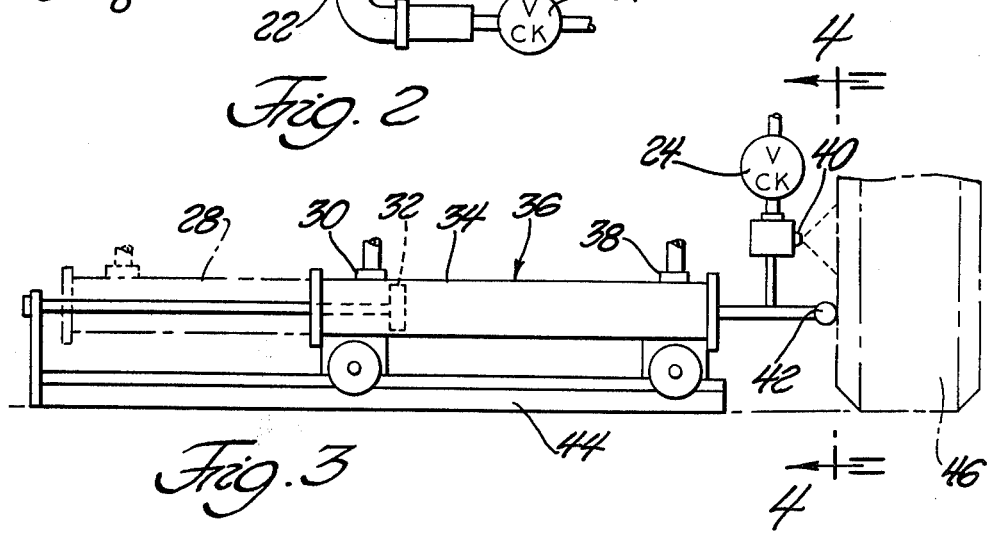
FIG. 3 is an enlarged view of one of the tire spray cleaning nozzles and pneumatic cylinders shown in the system of FIG. 1.
Figure 4:
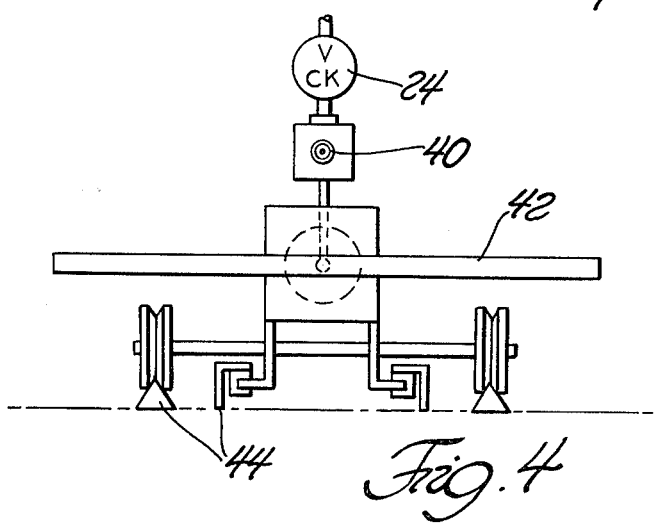
FIG. 4 is a view taken along lines 4—4 of FIG. 3.

Referring to FIGS. 1, 3 and 4, when air supply line 62 is allowed to freely communicate with the atmosphere by air supply control valve 60, air extender port 38 is also allowed to freely communicate with the atmosphere. The interior of extendable member 34 on the air extender port 38 side of piston 32, therefore, is at atmospheric pressure. A pressure differential within member 34 is created between the air extender port 38 side of piston 32 and the air retractor port 30 side of piston 32 by maintaining a constant pressure within member 34 on the air retractor port 30 side of piston 32 at a pressure above atmospheric pressure. This is done by connecting air retractor port 30 to pressurized air supply 54 through air retractor supply line 70. The pressure in air retractor supply line 70 is maintained at a constant pressure by retractor air pressure regulator 68. In practice, the air pressure in the air retractor supply line 70 may be maintained at 20 psi. The effect of the pressure differential created within extendable member 34 is to force extendable member 34 to slide along track means 44 to its fully retracted position 28.

Extendable member 34 remains in its fully retracted position 28 until a vehicle tire 46 rolls over switching device 52. Switching device 52 may be any type of pressure sensitive switching device, typically in practice a pneumatic signal hose. When vehicle tire 46 rolls over switching device 52, air supply control valve 60 is activated. Activation of air supply control valve 60 shuts off air supply line 62 from the atmosphere and connects it to pressurized air line 56. This increases the pressure in air supply line 62 to an air pressure regulated by pressurized air line regulator 58. In practice the air pressure in air supply line 62 may be set at 40 psi.

Raising the air pressure in air supply line 62 increases the pressure within extendable member 34 on the air extender port 38 side of piston 32. When the pressure in extendable member 34 on air extender port 38 side of piston 32 becomes greater than the air pressure on the air retractor port 30 side of piston 32, slidable member 34 is forced to slide on track means 44 to extension position 36. Slidable member 34 reaches extension position 36 when abutment means 42 contacts vehicle tire 46. The actual point at which extension position 36 will be reached, therefore, is dependent upon the width of the particular vehicle whose tire 46 has activated switching device 52. Making extension position 28 dependent upon the width of the particular vehicle whose tires 46 are being spray cleaned, allows spray nozzles 40 to automatically be positioned at an optimal distance from vehicle tires 46 during each cleaning cycle.

It should be noted that tire spray cleaning nozzles 40 need only be mounted on extendable member 34 on one side of the car wash line. Vehicle tires 46 roll in vehicle guide rails 48 on one side of the car wash line to control the path of the vehicle as it travels along the wash line. This means that the position of the vehicle tire 46 on the vehicle guide rail 48 side of the vehicle will always be in a predictable location when it reaches the tire spray cleaning station, regardless of the width of the vehicle.

On the vehicle guide rail 48 side of the car wash line, therefore, it is possible to mount spray cleaning nozzles 40 on a stationary base 50 and be assured that the nozzles 40 will always be at an optimal distance from the vehicle tires 46.

Referring to FIGS. 1 and 2, while connecting air supply line 62 to pressurized air line 56 causes extendable member 34 to extend to full extension position 36, it simultaneously raises the pressure within cleaning fluid discharge container 4 from atmospheric pressure to the pressure determined by pressurized air regulator 58. Raising the pressure in cleaning fluid discharge container 4 causes fluid filler check valve 8 to close. This prevents cleaning fluid within cleaning fluid discharge container 4 from flowing out of fluid filler port 6, and allows the pressure within cleaning fluid discharge container 4 to increase to a point where spring loaded ball check valves 24 are forced open.

When spring loaded ball check valves 24 are forced open, the fluid within cleaning fluid discharge container 4 and floating valve assembly 10 is forced through fluid outlet port 22. From fluid outlet port 22, the cleaning fluid flows through cleaning fluid supply line 72 to spray cleaning nozzles 40 where it is sprayed on vehicle tires 46.

As the cleaning fluid level in floating valve assembly 10 decreases, floating body 20 is lowered along with the surface of the cleaning fluid to a point where it eventually comes to rest over fluid outlet port 22. The pressure within cleaning fluid discharge container 4 then causes floating body 20 to firmly seat in and seal off fluid outlet port 22. This prevents cleaning fluid supply line 72 from being blown out of cleaning fluid, leaving cleaning fluid supply line 72 filled with fluid and prepared for the next spray cleaning cycle.

When vehicle tires 46 roll off switching device 52, air supply control valve 60 is deactivated. Deactivation of air supply control valve 60 disconnects air supply line 62 from pressurized air line 56, and allows air supply line 62 to freely communicate with the atmosphere. This once again creates a pressure differential within extendable member 34 on each side of piston 32 which forces extendable member 34 back into its fully retracted position 28. This also reduces the pressure within cleaning fluid discharge container 4 to a point where the cleaning fluid within reservoir 2 forces open fluid filler check valve 8 and refills cleaning fluid discharge container 4 in preparation for the next spray cleaning cycle.

Returning to FIG. 1, an agitating nozzle 66 is utilized to mix the contents of the cleaning fluid reservoir 2 during each spray cleaning cycle to ensure a homogeneous distribution of the constituents of the cleaning fluid within cleaning fluid reservoir 2. This is accomplished by connecting agitating nozzle 66 to air supply line 62. During a cleaning cycle when air supply line 62 is connected to pressurized air line 56, pressurized air is discharged through agitating nozzle 66. This discharge of pressurized air through agitating nozzle 66 agitates the contents of fluid reservoir 2, and produces a mixing effect. The amount of pressurized air discharged through agitating nozzle 66, and the corresponding degree of agitation of the contents of cleaning fluid reservoir 2 during a cleaning cycle, may be regulated by needle valve 64.

The invention has been described in an illustrative manner, and it is to be understood that the terminology which has been used is intended to be in the nature of words of description rather than of limitation. It will be apparent to those skilled in the art that modifications and variations in the disclosed embodiment can be made without departing from the scope and spirit of the invention.

What is claimed is:

1. A system for spray cleaning tires of vehicles traveling along automatic car wash lines comprising: a reservoir for cleaning fluid, a cleaning fluid discharge container in fluid communication with the reservoir, a tire spray cleaning nozzle for spraying cleaning fluid onto vehicle tires, a cleaning fluid supply line through which cleaning fluid can flow from the cleaning fluid discharge container to the spray cleaning nozzle, a source of pressure, pressure control means activated when vehicle tires are in position to be sprayed which connects the cleaning fluid discharge container with the source of pressure to cause cleaning fluid to flow from the cleaning fluid discharge container through the cleaning fluid supply line to the tire spray cleaning nozzle, and a floating valve means responsive to the flow of fluid from the cleaning fluid discharge container to the tire spray cleaning nozzle to prevent the cleaning fluid supply line from being purged of cleaning fluid.

2. A system as claimed in claim 1 wherein: the floating valve means includes a floating body guide and guide cap in fluid communication with the cleaning fluid discharge container, and a floating body which moves with the surface of the cleaning fluid within the floating body guide.

3. A system as claimed in claim 1 further including agitating means responsive to activation of the pressure control means to agitate and mix the fluid in the reservoir.

4. A system as claimed in claim 1 further including an automatically adjusting vehicle tire spray cleaning apparatus for spray cleaning tires of vehicles traveling along car wash lines comprising: a pair of members connected together for telescopic movement between extended and retracted positions with respect to each other, a nozzle for spraying cleaning fluid onto vehicle tires, abutment means carried by one of said members and connected with said nozzle for engaging vehicle tires to position the nozzle a fixed distance from the tire, means to extend the abutment means to a point where the abutment means engages vehicle tires, and means to retract the abutment means upon completion of the spray cleaning operation.

5. A system as claimed in claim 4 wherein: the floating valve means includes a floating body guide and guide cap in fluid communication with the cleaning fluid discharge container, and a floating body which moves with the surface of the cleaning fluid within the floating body guide.

6. A system as claimed in claim 4 further including agitating means responsive to activation of the pressure control means to agitate and mix the fluid in the reservoir.

7. An automatically adjusting vehicle tire spray cleaning apparatus for spray cleaning tires of vehicles traveling along car wash lines comprising: a pair of members connected together for telescopic movement between extended and retracted positions with respect to each other, a nozzle for spraying cleaning fluid onto vehicle tires, abutment means carried by one of said members and connected with said nozzle for engaging vehicle tires to position the nozzle a fixed distance from the tire, means to extend the abutment means to a point where the abutment means engages vehicle tires, and means to retract the abutment means upon completion of the spray cleaning operation.

* * * * *